(12) United States Patent
Yamamoto et al.

(10) Patent No.: US 7,737,575 B2
(45) Date of Patent: Jun. 15, 2010

(54) ELECTRIC POWER SUPPLY SYSTEM FOR VEHICLE

(75) Inventors: Takao Yamamoto, Saitama (JP); Katsuhiro Ouchi, Saitama (JP); Tomohiko Yashiro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 600 days.

(21) Appl. No.: 11/642,937

(22) Filed: Dec. 21, 2006

(65) Prior Publication Data

US 2007/0145942 A1 Jun. 28, 2007

(30) Foreign Application Priority Data

Dec. 28, 2005 (JP) ............................. 2005-377401

(51) Int. Cl.
*H02J 7/00* (2006.01)
(52) U.S. Cl. ........................................................ 307/9.1
(58) Field of Classification Search .................... 307/9.1
See application file for complete search history.

(56) References Cited

U.S. PATENT DOCUMENTS 5,650,713 A 7/1997 Takeuchi et al.
6,157,091 A * 12/2000 Yoshida et al. ............. 307/10.1

FOREIGN PATENT DOCUMENTS

JP 2004-282831 A 10/2004

* cited by examiner

*Primary Examiner*—Fritz M Fleming
*Assistant Examiner*—Dru M Parries
(74) *Attorney, Agent, or Firm*—Birch, Stewart, Kolasch & Birch, LLP

(57) ABSTRACT

To enable a circuit configuration to be easily changed over depending on whether a recoil starter is present or absent. A battery charged by a generator driven by an engine, a charging circuit for charging the battery by the generator, and a drive electric power supply circuit for supplying engine drive system loads with electric power generated by the generator, are provided. In a system having a recoil starter, a contact configuration is adopted in which, when an ignition switch is changed over to a recoil start position, the charging circuit is disconnected and the drive electric power supply circuit is connected. The disconnection of the charging circuit may be conducted by use of a charging inhibition relay. The charging inhibition relay is formed as a sub harness, and, in a system not using the recoil starter, the sub harness is replaced by a sub harness in which the charging inhibition relay is not mounted.

14 Claims, 9 Drawing Sheets

3: Battery
4: Regulator
17: Stop switch
18: Inclination switch
81: Fuel pump
82: Ignition coil
84: Injector 3: Battery
4: Regulator
17: Stop switch
18: Inclination switch
81: Fuel pump
82: Ignition coil
84: Injector 3: Battery
4: Regulator
8: Engine drive system loads
9: Lamp/display system loads A: Position B: Contact C: First power source D: Ignition E: Second power source

ELECTRIC POWER SUPPLY SYSTEM FOR VEHICLE

CROSS-REFERENCE TO RELATED APPLICATIONS

This nonprovisional application claims priority under 35 U.S.C. §119(a) on Patent Application No. 2005-377401, filed in Japan on Dec. 28, 2005, the entirety of which is incorporated herein by reference.

FIELD OF THE INVENTION

The present invention relates to an electric power supply system for a vehicle. In particular, the present invention relates to an electric power supply system for a vehicle in which a battery is charged with a power generation output of a generator driven by an engine and electric power for engine control is supplied from the battery.

DESCRIPTION OF BACKGROUND ART

Various systems are known in which a generator is driven by an engine, such as vehicles, boats and portable generators. In these systems, a battery is charged with electric power generated by the generator, and the engine is started by electric power supplied from the battery. However, where the battery has been completely discharged or its capacity has been lowered, there may be cases where the generator is driven by use of a human-power starting device such as a recoil starter and a kick device, and the engine is started by the power generation output of the generator.

Japanese Patent Laid-open No. 2004-282831 describes an electric power supply system for a vehicle in which a kick starter is provided as a human-power starting device. This electric power supply system is so configured that when the battery is in an abnormal condition, a battery control relay and a load control relay are turned OFF, and then a kicking operation for starting the engine is conducted. With the battery control relay and the load control relay turned OFF, the electric power generated by the kicking operation can be prevented from being exhausted in the form of a flow of current to the battery or other loads irrelevant to the starting of the engine. The electric power is supplied preferentially to a fuel supply system, an ignition system and the like indispensable for driving the engine.

The electric power supply system for a vehicle described in Japanese Patent Laid-open No. 2004-282831 has a configuration in which a control relay capable of selecting the part(s) to be supplied with electric power generated so as to inhibit the charging of the battery at the time of starting, for example, is provided in order to secure an engine starting performance during starting of the engine by the kick starter. However, such a control relay is not needed in a vehicle that does not include a kick starter, a recoil starter or the like. There may be cases where, for example, vehicles of the same model differ in specifications according to their destinations, and some of them have a recoil starter but others of them do not have a recoil starter. In manufacturing such vehicles, it is troublesome to separately produce circuit boards including a control relay and circuit boards not including the control relay, on the basis of each vehicle. In view of this, it is desired to facilitate the separate manufacturing of vehicles having a control relay and vehicles not having the control relay.

SUMMARY OF THE INVENTION

It is an object of the present invention to provide an electric power supply system for a vehicle capable of obviating the troublesomeness in separately manufacturing vehicles including a human-power starting device such as a recoil starter and vehicles not including such a human-power starting device.

The present invention, in order to attain the above object, includes a generator driven by an engine to generate electric power, a battery charged by the electric power generated by the generator, a control unit for controlling the engine by electric power supplied from the battery, and a relay disposed between the battery and the generator and operative to make disconnection or connection between the generator and the battery according to an instruction from the control unit, thereby inhibiting charging or canceling the inhibition of charging, and the relay is included in a circuit that can be detachably attached to the control unit, and the control unit is configured so that a connection circuit for connection of a connection terminal to the circuit that includes the relay can be detachably attached in place of the circuit that includes the relay.

In addition, according to an embodiment of the present invention, the circuit that includes the relay and the connection circuit are each configured as a sub harness which can be detachably attached to the control unit.

Furthermore, another embodiment of the present invention includes a generator driven by an engine to generate electric power, a battery charged by the electric power generated by the generator, a charging circuit for charging the battery with the electric power generated by the generator, a drive electric power supply circuit for supplying an engine drive system load with the electric power generated by the generator, and a switch having a recoil start position as a changeover position, and the switch includes a contact configuration such as to disconnect the charging circuit and connect the drive electric power supply circuit when the switch is changed over to the recoil start position.

Furthermore, according to an embodiment of the present invention, the switch is an ignition switch further having an ignition-ON position and an ignition-OFF position as changeover positions.

According to the present invention, in the electric power supply system for a vehicle which does not need a relay for arbitrarily inhibiting the supply of charging electric power from the generator to the battery, it is possible to cancel the inhibition of charging of the battery by detaching the circuit that includes the relay from the control unit and attaching the connection circuit to the control unit as a substitute. This ensures that a simple circuit configuration not including the relay can be adopted for the electric power supply system for a vehicle in which it is unnecessary to inhibit the charging of a battery. In addition, such a changeover of circuitry can be easily conducted by replacing the circuit that includes the relay and the connection circuit, which are separate from the control unit. Therefore, vehicles including a control relay and vehicles not including the control relay can easily be manufactured separately.

According to an embodiment of the present invention, a changeover of circuitry can be easily carried out by only replacing the sub harness.

According to a further embodiment of the present invention, whether or not the electric power generated by the generator is supplied to the battery can be set by the user's operation of changing over the switch, so that the need for such members as relays is eliminated, and installation space can be saved.

According to an embodiment of the present invention, it suffices to additionally provide a contact for a recoil starter in an ignition switch, so that installation space can be saved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
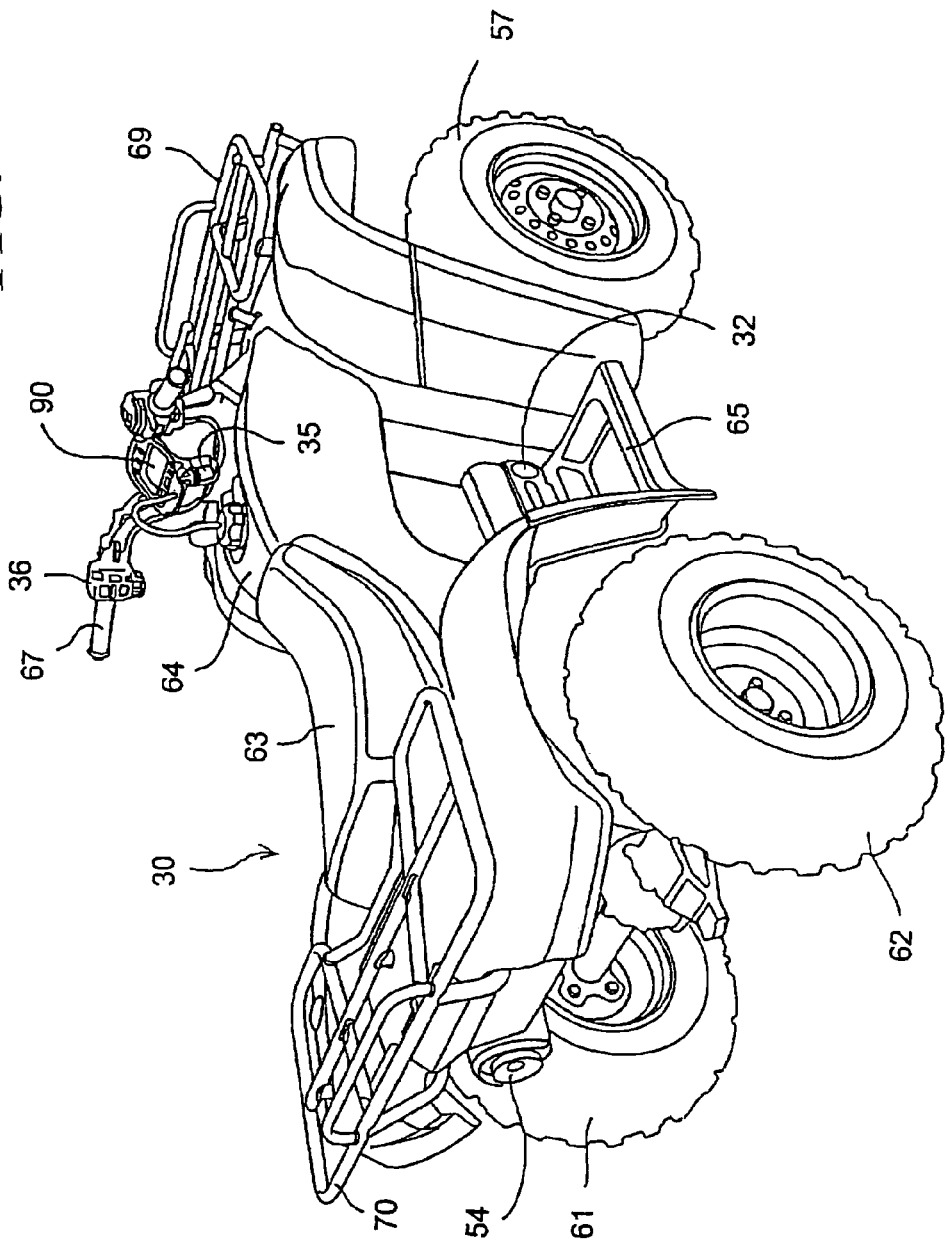
FIG. 4 is a perspective view, from the rear side, of an all-terrain vehicle to which the electric power supply system for a vehicle according to the one embodiment of the present invention has been applied.
Figure 15:
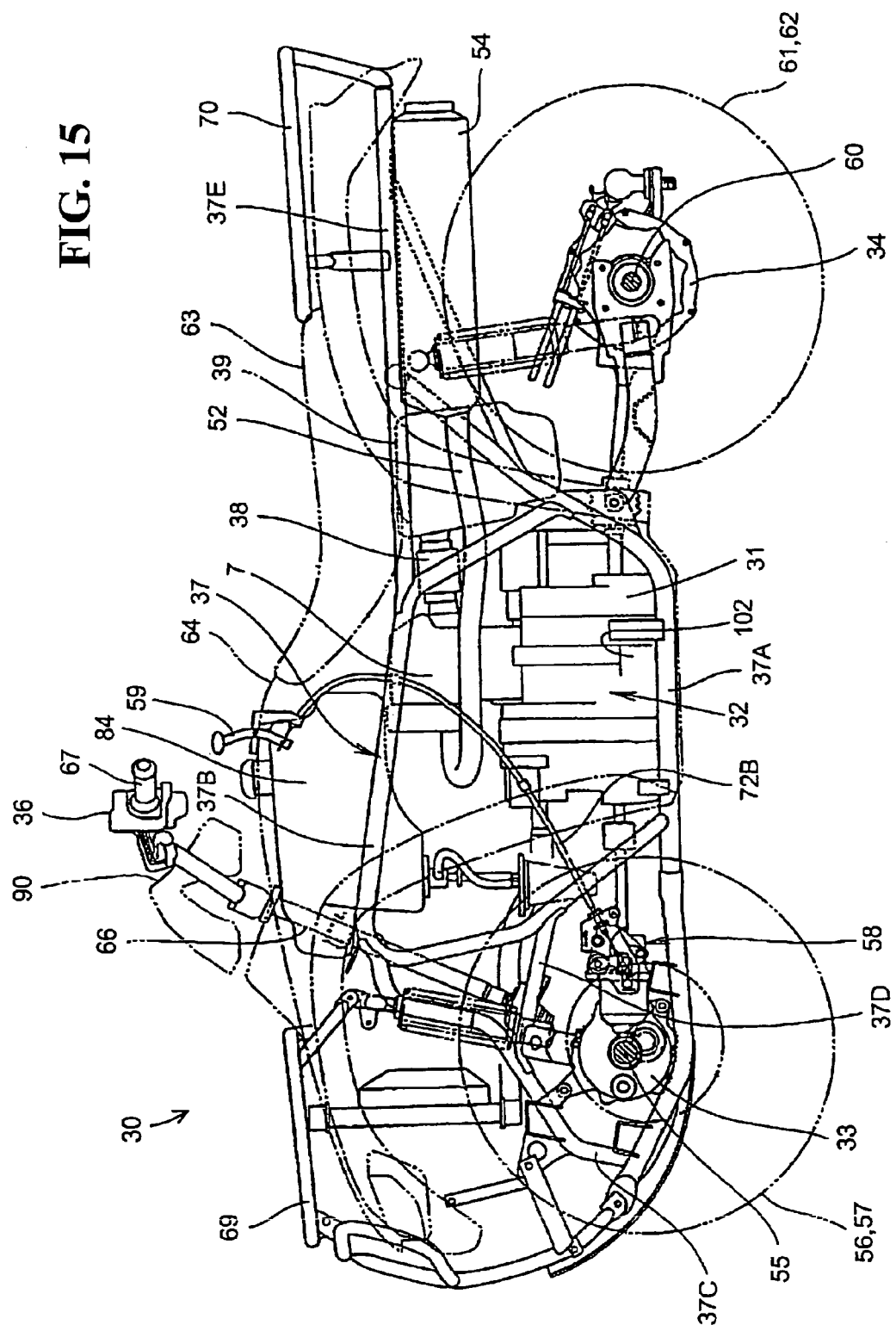
FIG. 15 is a left side view of the all-terrain vehicle.

An embodiment of the present invention will now be described below with reference to the accompanying drawings. FIG. 4 is a right perspective view of a vehicle to which an electric power supply system for a vehicle according to one embodiment of the present invention has been applied. FIG. 15 is a left side view of the vehicle. The vehicle 30 is an all-terrain vehicle (ATV) of the four-wheel-drive type. A power unit 32 including an engine 7 and a transmission 31 is longitudinally disposed roughly at the center of the vehicle 30. The power unit 32 is connected to a front final assembly 33 disposed on the front side and a rear final assembly 34 disposed on the rear side, in such a manner that the output of the engine 7 can be transmitted to the final assemblies 33, 34.

A vehicle body frame 37 includes a left-right pair of lower frames 37A for supporting a lower portion of the power unit 32. Upper frames 37B are attached to upper portions of the lower frames 37A so as to surround the power unit 32 in side view. A left-right pair of front frames 37C connect front upper portions of the upper frames 37B and front end portions of the lower frames 37A. A left-right pair of front connection frames 37D connect the front frames 37C and the upper frames 37B. A left-right pair of rear upper frames 37E extend rearwards from rear upper portions of the upper frames 37B and have intermediate portions connected to the rear ends of the lower frames 37A.

An air cleaner 39 is connected to the intake side of the engine 7 through a throttle body 38. An exhaust pipe 52 and a muffler 54 are provided on the exhaust side of the engine 7.

The front final assembly 33 is connected to the sides of left and right front wheels 56 and 57 through a left-right pair of drive shafts 55. The front final assembly 33 is additionally provided at its rear portion with a drive changeover part 58 for making and breaking the transmission of a drive power from the power unit 32 to the front final assembly 34. Specifically, the drive changeover part 58 puts the front wheel 56 and 57 into a drive condition or a non-drive condition, whereby the vehicle 30 is changed over between a rear-wheel-drive mode and a four-wheel-drive mode. The drive changeover part 58 changes over the front wheels 56 and 57 into a drivable condition when an operating lever 59 is operated. The rear final assembly 34 is connected to the sides of left and right rear wheels 61 and 62 through a left-right pair of drive shafts 60.

A driver's seat 63 is disposed on the upper side of the engine 7. A fuel tank 64 is provided on the front side of the seat 63. Steps 65, on which a rider's feet can be placed, are provided on both lateral lower sides of the engine 7. A steering handle 67 is supported on the front side of the fuel tank 64 by a steering shaft 66 mounted on the vehicle body frame 37. An instrument panel 90 is disposed at the center of the steering handle 67. An ignition switch 35, to be described in detail later, is provided at a side portion of the instrument panel 90. A combination switch 36 including an operating switch for the transmission 31, a starter switch, an engine stop switch, a lighting switch, a dimmer switch, etc. is provided in the vicinity of a left grip of the steering handle 67.

A front carrier 69 is provided at a front portion of the vehicle, and a rear carrier 70 is provided at a rear portion of the vehicle.

Figure 1:
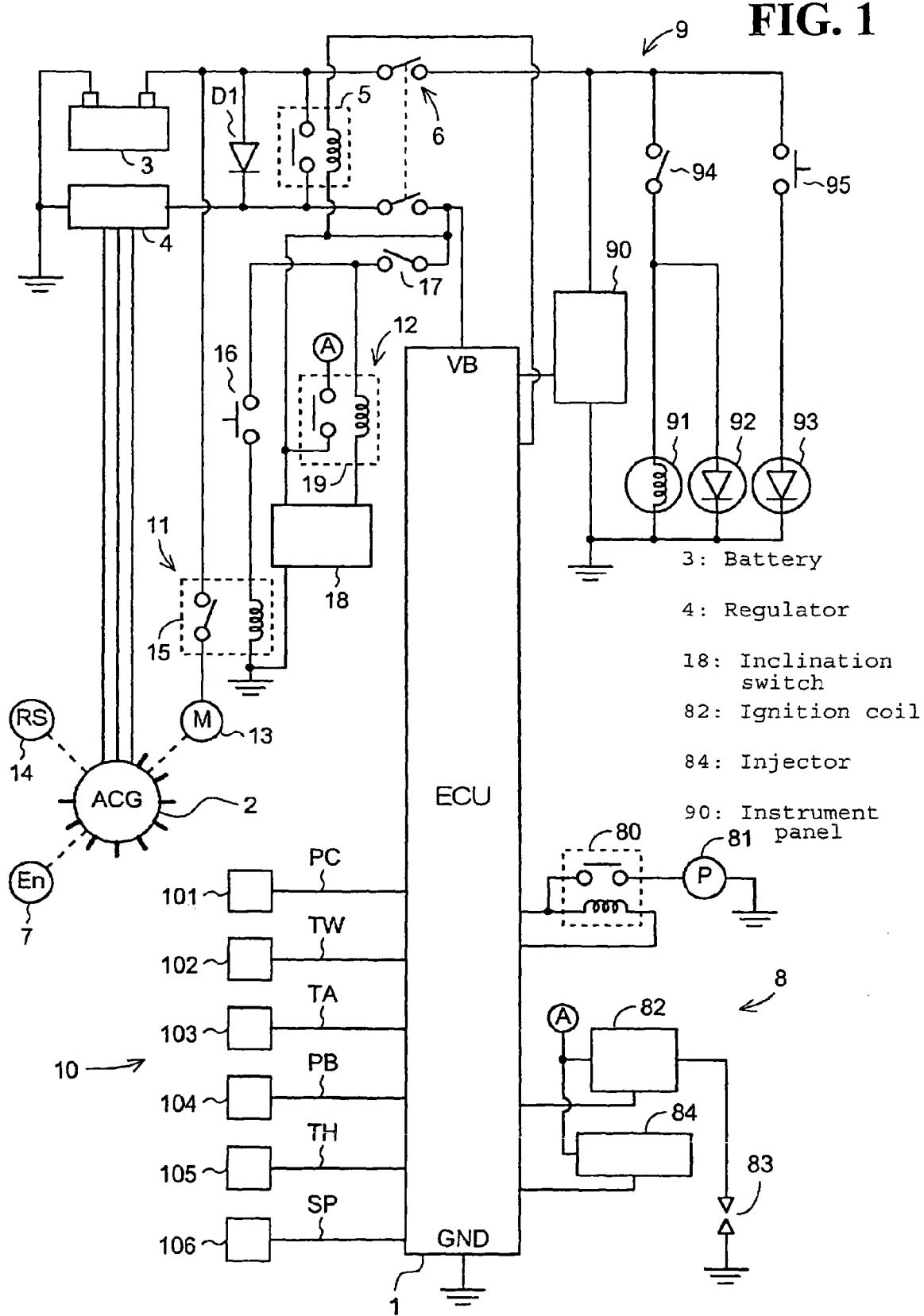
FIG. 1 is a block diagram of an electric power supply system according to one embodiment of the present invention.

FIG. 1 is a block diagram of the electric power supply system for a vehicle according to one embodiment of the present invention. The electric power supply system is mounted on the all-terrain vehicle, and supplies electric power needed for the running of the vehicle. In FIG. 1, the electric power supply system includes an ECU (control unit) 1, a generator 2, a battery 3, a regulator 4, a charging inhibition relay (relay means) 5, and a main switch 6. A reverse current preventive diode D1 is connected to both ends of the charging inhibition relay 5. The generator 2 is connected to an output shaft of the engine 7. Engine drive system loads 8 and lamp/display system loads 9 are connected to the ECU 1, as loads to be supplied with electric power from the electric power supply system. In addition, sensors 10, an engine starter 11, and an engine stopping device 12 are connected to the ECU 1.

The engine drive system loads 8 include a fuel relay 80, a fuel pump 81, an ignition system (an ignition coil 82 and a spark plug 83), and a fuel injection valve (injector) 84. The lamp/display system loads 9 include the instrument panel 90, a headlamp 91, a tail lamp 92 and a stop lamp 93. A lighting switch 94 and a stop switch 95, for energizing the lamps 91 to 93, are provided.

The sensors 10 include a crank pulser 101, a water temperature sensor 102, an air temperature sensor 103, a negative pressure sensor 104, a throttle opening sensor 105, and a speed sensor 106. The engine starter 11 includes a starter motor 13, a recoil starter 14, a starter relay 15, and a starter switch 16.

Furthermore, the engine stopping device 12 includes an engine stop switch 17, an inclination switch 18 opened when the inclination angle of the vehicle is in excess of a predetermined value over a predetermined period of time, and a stop relay 19 connected to the inclination switch 18.

The ECU 1 is an electronic controller for controlling the devices necessary for operating the vehicle, such as the engine drive system loads 8 and the lamp/display system loads 9, and includes a microcomputer. The generator 2 is driven by the engine 7 to generate an AC voltage. The regulator 4 has a rectifying part and a voltage regulating part, and outputs electric power by rectifying the output AC of the generator 2 and adjusting the rectified power to a predetermined battery voltage (e.g., DC 12 V). The starter motor 13 is driven by a current supplied from the battery 3 to start the generator 2. The recoil starter 14 is used to start the generator 2 by a manual operation, in place of the starter motor 13, in the case where the battery 3 has a low residual capacity or has been completely discharged or in other similar situations. Incidentally, while the generator 2 and the starter motor 13 are shown as separate bodies, they may be configured in an integral form, i.e., as a motor/generator.

In the above-mentioned configuration, first, operations in the case where the battery 3 is sufficiently charged will be described. The engine stop switch 17 is normally closed, and it is opened at the time of manually stopping the engine 7. Therefore, when the main switch 6 is turned ON and the starter switch 16 is turned ON in the condition where the vehicle is not inclined to or in excess of a predetermined value, the current from the battery 3 is passed through the diode D1, the switch 6, the engine stop switch 17, and the starter switch 16 into a coil of the starter relay 15. As a result, the contact of the starter relay 15 is closed, and a current flows in the starter motor 13. When the starter motor 13 is rotated, the engine 7 and the generator 2 are rotated attendantly.

In the case where the vehicle is substantially upright, the inclination switch 18 is in a closed state, so that the current from the battery 3 flows in a coil of the stop relay 19. Therefore, the contact of the stop relay 19 is closed, resulting in that a voltage can be impressed on the ignition coil 82 and the injector 84.

When a voltage is applied from the battery 3 to a power source voltage terminal VB through the diode D1, the ECU 1 starts a prescheduled operation. Specifically, the ECU 1 passes a current to the coil of the fuel relay 80 to close its contact, thereby rotating the fuel pump 81. With the fuel pump 81 rotated, fuel is fed under pressure from the fuel tank (not shown here) to the injector 84. When the injector 84 is opened with a predetermined timing to inject the fuel, the spark plug 83 fires under the action of the ignition coil 82, whereby a fuel-air mixture is ignited. The timing and the duration of injection of the fuel from the injector 84 and the timing of ignition by the spark plug 83 are determined based on a crank angle of the engine 7 computed based on a crank pulse PC outputted from the crank pulser 101, a cooling water temperature TW detected by the water temperature sensor 102, an intake air temperature TA detected by the air temperature sensor 103, a throttle opening TH detected by the throttle opening sensor 10, and a vehicle speed SP detected by the speed sensor 106.

Furthermore, when the main switch 6 is turned ON, the instrument panel 90 is energized, and a condition where the headlamp 91, the rear lamp 92, and the stop lamp 93 can be turned ON is obtained.

With the ECU 1 started operating, a current flows in the coil of the charging inhibition relay 5, whereby the contact of the charging inhibition relay 5 is closed. As a result, an output terminal of the regulator 4 is connected to the battery 3 through the contact of the charging inhibition relay 5, with the result that the battery 3 can be charged with the output AC from the generator 2. During the rotation of the engine 7, the current supplied from the generator 2 through the regulator 4 and the current from the battery 3 are supplied to the ECU 1 and peripheral apparatuses in a cooperating manner.

The engine 7 is not only stopped manually by operating the engine stop switch 17 but also stopped automatically when the vehicle has been inclined to or in excess of a predetermined value over a predetermined period of time. Specifically, the engine 7 is stopped when the inclination switch 18 is opened with the result that no voltage is impressed on the ignition coil 82 and the injector 84.

In the next place, operations in the cases where the charging of the battery 3 is insufficient will be described below. Where the residual capacity of the battery 3 is low and cannot supply electric power sufficient for driving the ECU 1 and the starter motor 13, the engine 7 is started by use of the recoil starter 14. First, the main switch 6 is turned ON, to rotate the engine 7 and the generator 2 by the recoil starter 14, in place of the starter motor 13. Where the charging of the battery 3 is insufficient, the charging inhibition relay 5 is not energized, and the circuit from the regulator 4 to the battery 3 is broken, so that the output voltage of the generator 2 is not used for charging the battery 3. Therefore, the electric power generated by the generator 2 is supplied preferentially for the operations of the ECU 1 through the regulator 4.

When the electric power generated by the generator 2 is supplied to the ECU 1, the ECU 1 drives the fuel pump 81, and energizes the injector 84 and the spark plug 83, to make ignition in the engine 7. With the engine 7 started, the ECU 1 energizes the charging inhibition relay 5, in the same manner as when the engine 7 is started by use of the starter motor 13. As a result, the power generation output of the generator 2 is connected to the battery 3 through the contact of the charging inhibition relay 5, with the result that the battery 3 can be charged.

The foregoing is the configuration and operations of the vehicle in which the recoil starter and the starter motor are both provided. As a modified example of the vehicle, there may be considered a vehicle in which the recoil starter 14 is not adopted. In this case, it is presumed that the engine 7 is started by electric power supplied from the battery 3. In other words, in the case of such a vehicle, starting of the engine 7 is not conducted when the charging of the battery 3 is insufficient. In this case, therefore, there is no need for the charging inhibition relay 5, which plays a role at the time of starting where the charging of the battery 3 is insufficient.

Accordingly, it is preferable that an electric power supply system including the charging inhibition relay 5 and an electric power supply system not including the charging inhibition relay 5 can easily be produced separately. For example, it is favorable that a circuit board can be used in common whether the charging inhibition relay 5 may be present or absent.

Figure 2:
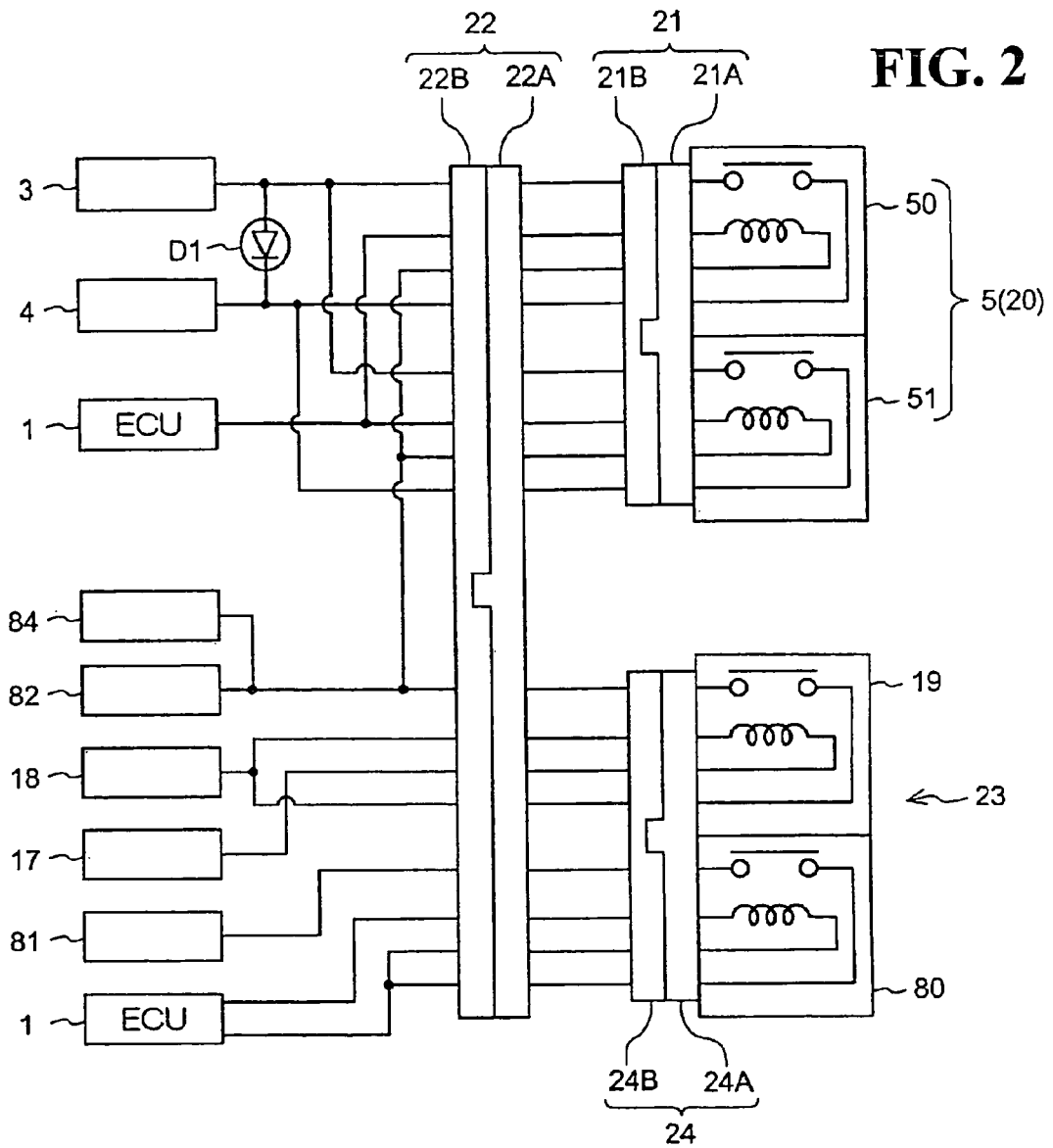
FIG. 2 is a relay connection diagram in the electric power supply system according to one embodiment of the present invention.

An embodiment in which a circuit board can be used in common will now be described. FIG. 2 shows a relay connection part in an electric power supply system for a vehicle in which a recoil starter 14 and a charging inhibition relay 5 are provided. A first relay group 20 includes two relays 50 and 51. The relays 50 and 51 are disposed in parallel, to constitute the charging inhibition relay 5. The relays 50 and 51 are mounted to a plug 21A of a connector 21. A receptacle 21B of the connector 21 is connected to a plug 22A of a gang connector 22. A receptacle 22B of the gang connector 22 connects the common parts of the relays 50 and 51 to each other, and is connected to a battery 3, a regulator 4, an ECU 1, an ignition coil 82 and an injector 84.

A second relay group 23 is composed of a stop relay 19 and a fuel relay 80 which are mounted to a plug 24A of a connector 24. A receptacle 24B of the connector 24 is connected to a plug 22A of a gang connector 22. A receptacle 22B of the gang connector 22 corresponding to the second relay group 23 is connected to a circuit which connects the stop relay 19 to the ignition coil 82, the injector 84, an inclination switch 18 and a stop switch 17, and connects the fuel relay 80 to a fuel pump 81 and the ECU 1.

Figure 3:
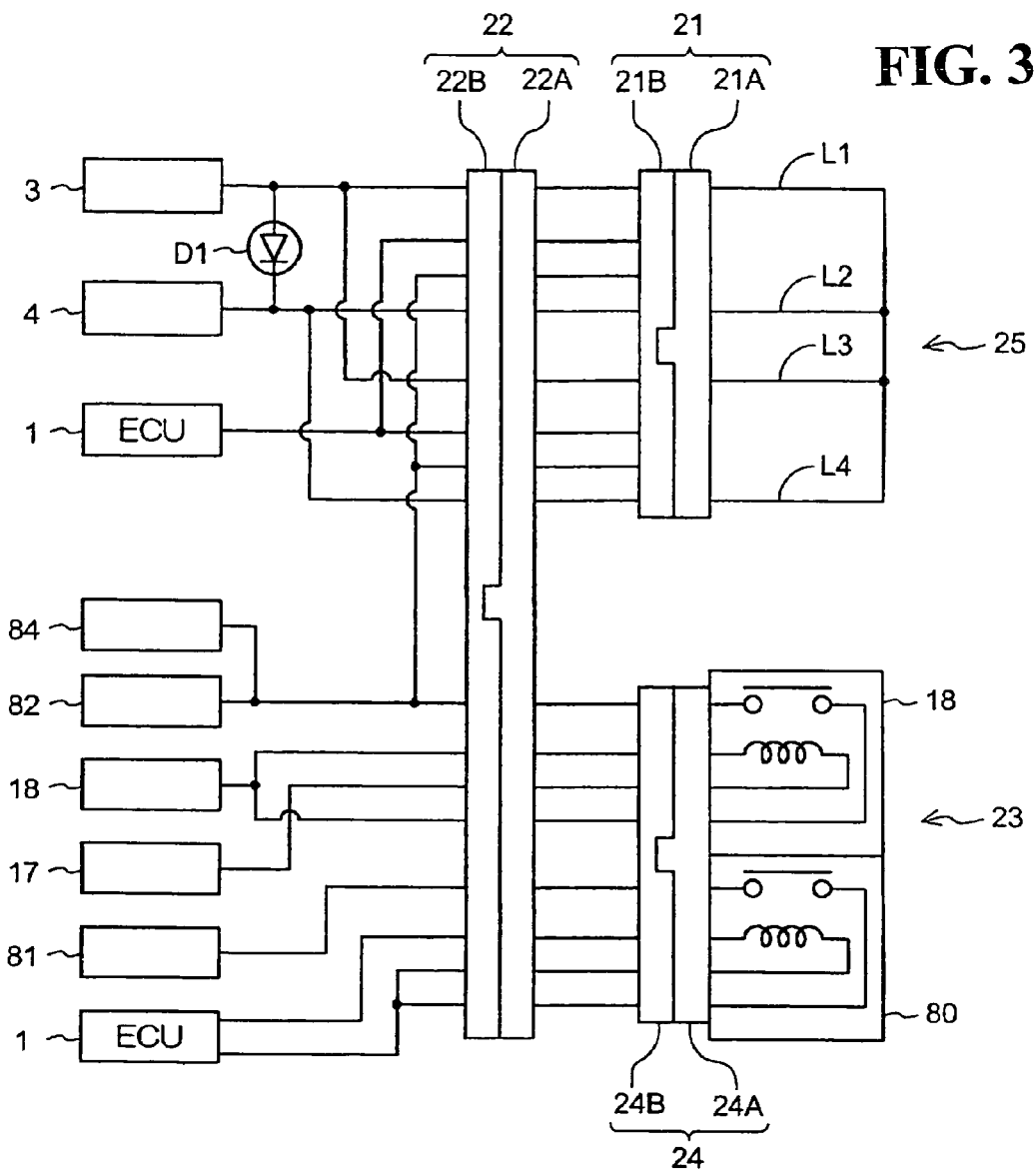
FIG. 3 shows a relay connection part in an electric power supply system that does not include a recoil starter or a charging inhibition relay.

FIG. 3 shows a relay connection part of an electric power supply system in which the recoil starter and the charging inhibition relay 5 are not provided. In the figure, the same symbols as those in FIG. 2 denote the same or equivalent parts to the above. The relay connection part in FIG. 3 has a sub harness 25 including a connection circuit connected to a gang connector 22, in place of a sub harness including the charging inhibition relay 5. The sub harness 25 is composed of a plug 21A conforming to a receptacle 21B of a connector 21 and a wire part composed of four lines L1 to L4 which are connected to the plug 21A and end portions of which are connected to each other.

As shown in FIGS. 2 and 3, the charging inhibition relay 5 is mounted to or not mounted to the electric power supply system depending on whether the vehicle includes the recoil starter 14 or does not include the recoil starter 14. In the case of manufacturing the electric power supply systems differing in configuration in this manner, it suffices that either one of the sub harness including the charging inhibition relay 5 as relay means capable of arbitrarily inhibiting charging or canceling the inhibition of charging and the sub harness 25 not including the charging inhibition relay 5 and composed of the wire part (connection circuit) consisting only of the lines L1 to L4 is selected and mounted to the receptacle 21B of the connector 21.

In the above embodiment, the supply of electric power to the battery can be inhibited and the inhibition can be canceled, through replacement of the sub harness. The circuit board as a main body can be used in common for both cases.

A second embodiment of the present invention will now be described. In the second embodiment, the supply of electric power to a battery 3 can be inhibited and the inhibition can be canceled, by changing over an ignition switch 35.

Figure 5:
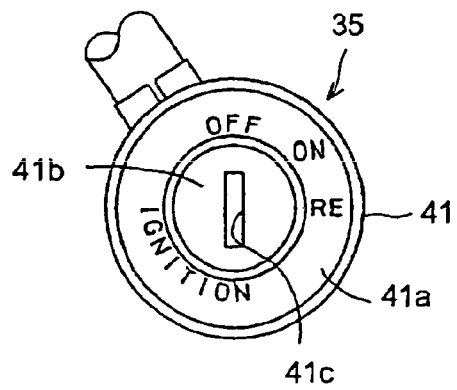
FIG. 5 is a front view of an ignition switch.
Figure 6:
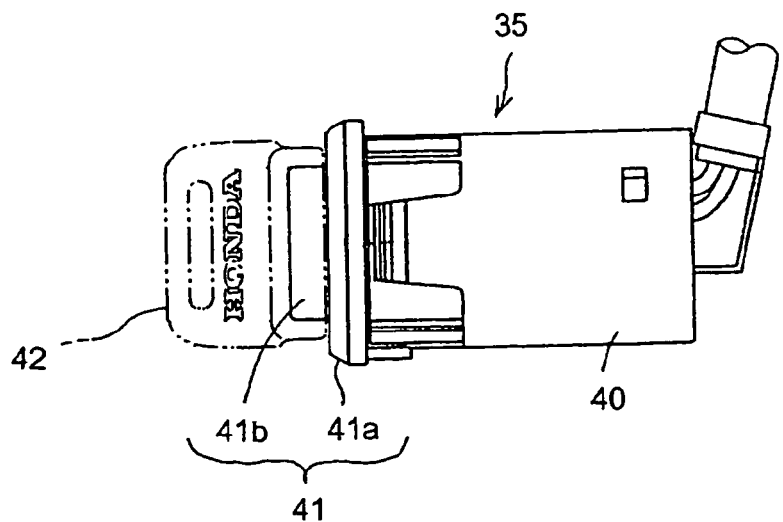
FIG. 6 is a side view of the ignition switch.
Figure 7:
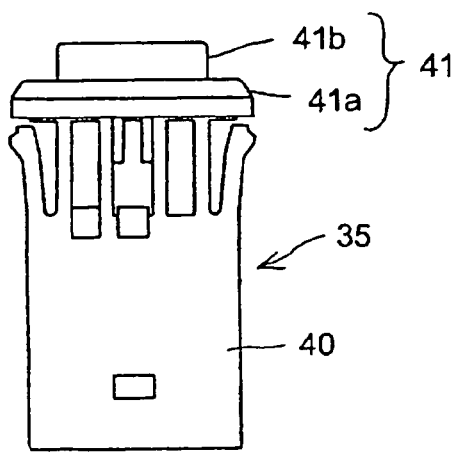
FIG. 7 is a bottom view of the ignition switch.

FIG. 5 is a front view of the ignition switch, FIG. 6 is a side view of the same, and FIG. 7 is a bottom view of the same. The ignition switch 35 is composed of a switch case 40 having a size conforming to a fitting hole provided in an instrument panel 90, and a cap 41 on the front side. The cap 41 includes an outer peripheral part 41a fixed to the instrument panel 90. A rotating part 41b is fitted in the inner periphery of the outer peripheral part 41a and is provided with a key insertion hole 41c in a central portion thereof. The rotating part 41b is connected to a cylinder (not shown) contained in the switch case 40, and can be rotated to coincide with an ignition-OFF (OFF) position, an ignition-ON (ON) position, and a recoil start (RE) position by inserting a key 42 therein.

Figure 8:
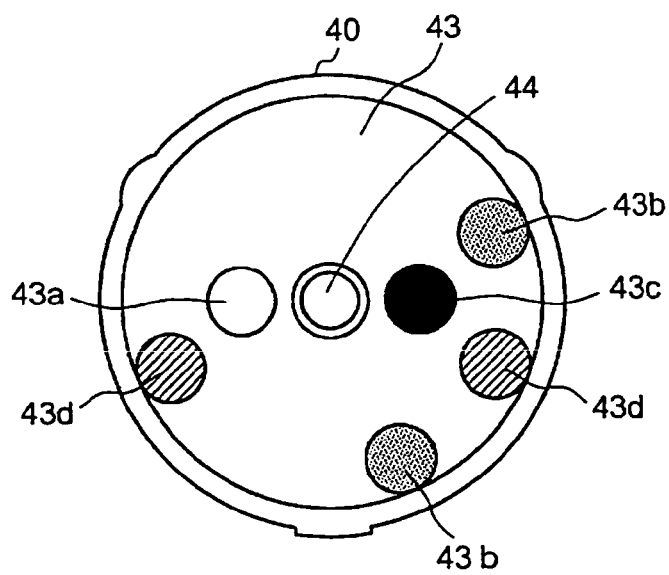
FIG. 8 is a layout diagram of fixed contacts of the ignition switch.

FIG. 8 is a layout diagram of fixed contacts provided in the switch case 40. The fixed contacts disposed on a fixed insulating block 43 are composed of a DC contact 43a, a pair of first power source contacts 43b, a second power source contact 43c, and a pair of ignition contacts 43d. The fixed insulating block 43 fitted in the switch case 40 is provided with a hole 44 so formed that a dowel (described later) provided at the center of rotation of a movable insulating block connected to the rotating part 41b for holding movable contacts (described later) can be inserted therein. Specifically, the movable insulating block provided at the rotating part 41b can be turned relative to the fixed insulating block 43.

Figure 9:
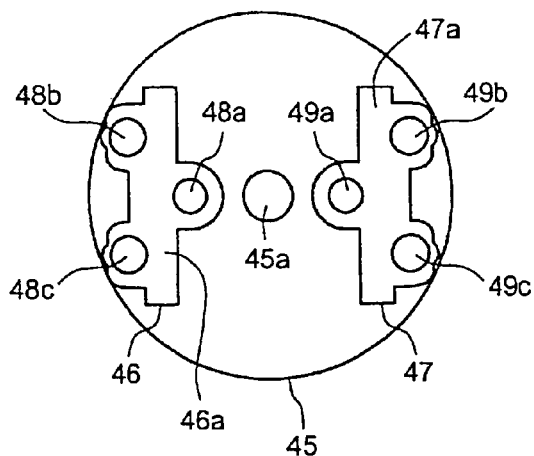
FIG. 9 is a front view of a movable contact plate.

FIG. 9 shows a front view of a switch movable part, i.e., the side opposed to the fixed insulating block 43. A pair of movable contact plates 46 and 47 are held on the movable insulating block 45. The movable block 45 is provided at its center with the dowel 45a conforming to the above-mentioned hole 44. The movable contact plates 46, 47 include insulating plates 46a, 47a, and sets of three movable contacts 48a, 48b, 48c and 49a, 49b, 49c.

Figure 10:
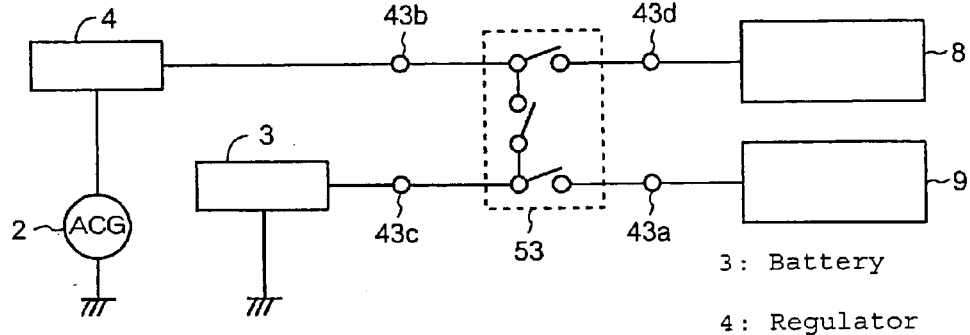
FIG. 10 is a system diagram of an electric power supply system including the ignition switch.

The circuit configuration of changeover positions of the ignition switch and the positional relationships between the fixed contacts and the movable contacts will be described. FIG. 10 is a system diagram of an electric power supply system including the ignition switch 35. The DC contact 43a of the ignition switch 35 is connected to the lamp/display system loads 9. The first power source contacts 43b are connected to the output side of the regulator 4. In addition, the second power source contact 43c is connected to the battery 3. The ignition contacts 43d are connected to an engine drive system. The function 53 of connecting and disconnecting the fixed contacts 43a to 43d is realized by the movable contacts.

Figure 11A:
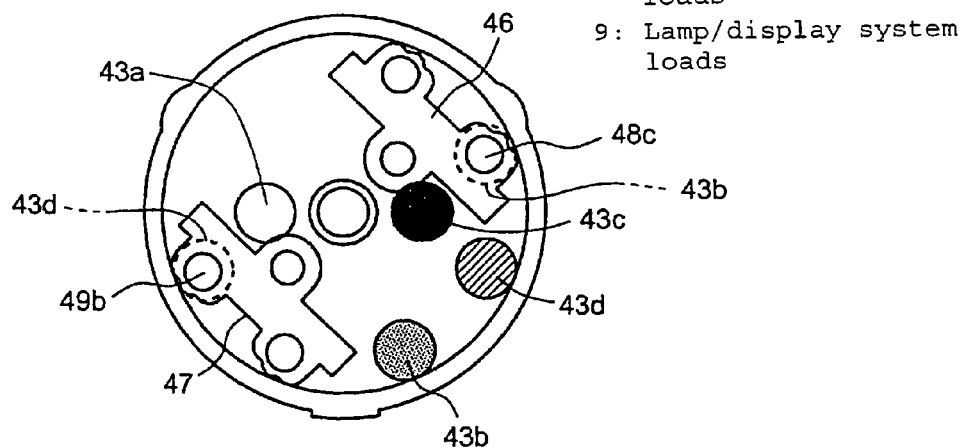
FIG. 11 shows the contact positions in an ignition-OFF position and the relevant circuit configuration.
Figure 11B:
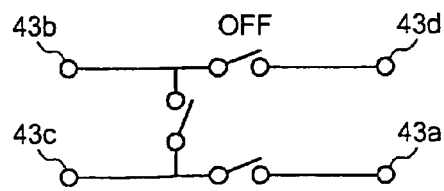
Figure 12A:
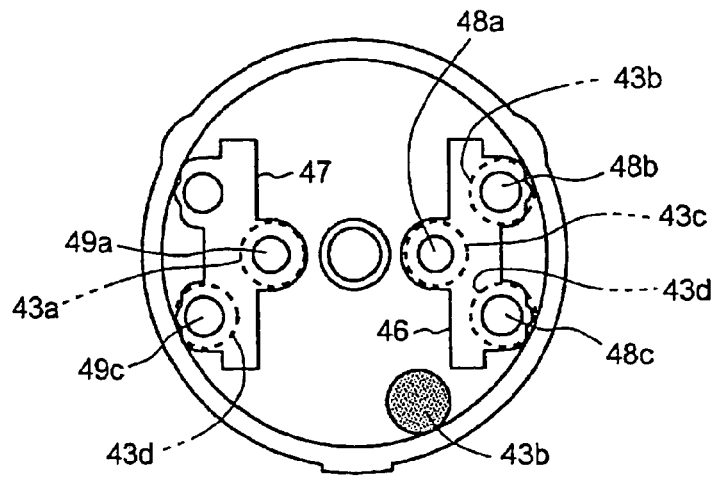
FIG. 12 shows the contact positions in an ignition-ON position and the relevant circuit configuration.
Figure 12B:
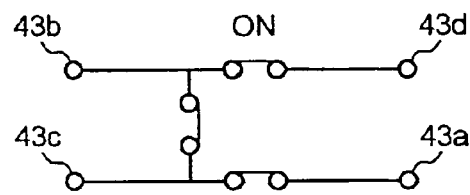
Figure 13A:
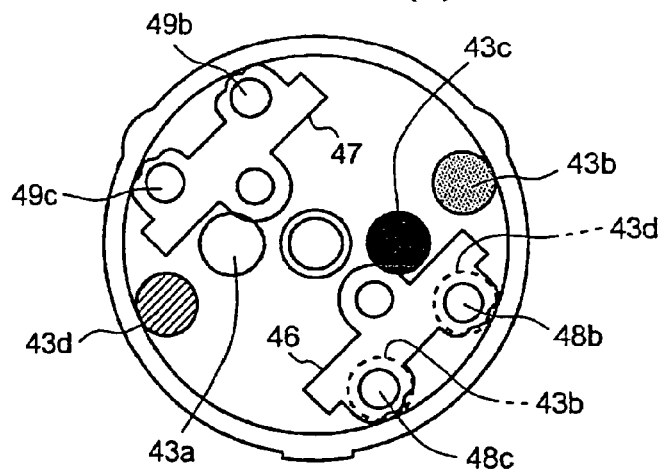
FIG. 13 shows the contact positions in a recoil start position and the relevant circuit configuration.
Figure 13B:
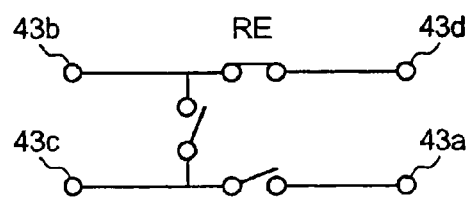
Figure 14:
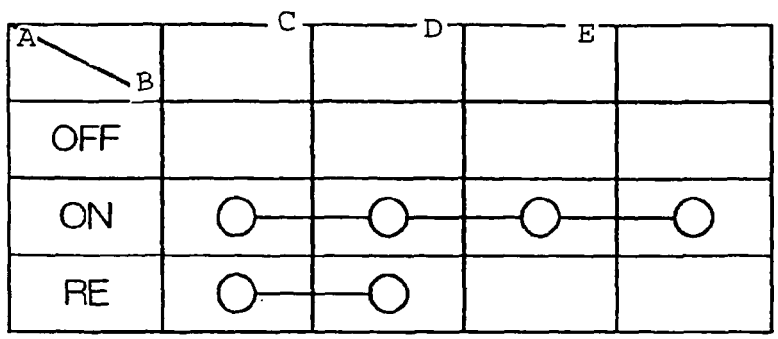
FIG. 14 shows collectively the connection relations of contacts.

FIG. 11 shows the contact positions at the ignition-OFF position and the relevant circuit configuration. FIG. 12 shows the contact positions at the ignition-ON position and the relevant circuit configuration. FIG. 13 shows the contact positions at the recoil start position and the relevant circuit configuration. FIG. 14 shows collectively the connection relations in FIGS. 11 to 13.

In FIGS. 11 to 13, when two or more of the three movable contacts in each of the movable contact plates 46, 47 overlap with the fixed contacts, the two or more fixed contacts are ON.

In the ignition-OFF position shown in FIG. 11, only the movable contact 48c and the movable contact 49b in the movable contact plate 46 and the movable contact plate 47 overlap respectively with the fixed contacts 43b and 43d, so that the fixed contacts are in a mutually OFF (disconnected) state. In other words, the generator 2 and the battery 3 do not supply electric power to the lamp/display system loads or the engine drive system loads.

In the ignition-ON position shown in FIG. 12, the movable contacts 48a to 48c on the movable contact plate 46 overlap respectively with the fixed contacts 43c, 43b, 43d, and the movable contacts 49a, 49c on the movable contact plate 47 overlap with the fixed contacts 43a, 43d. Therefore, all the fixed contacts are mutually connected, so that electric power is supplied from the generator 2 to the battery 3, and charging is possible. In addition, electric power can be supplied to the lamp/display system loads 9 and the engine drive system loads 8 from both the generator 2 and the battery 3. By changing over the ignition switch 35 into the ignition-ON position and depressing the starter switch, it is possible to rotate the starter motor and to start the engine.

In the recoil start position shown in FIG. 13, the movable contacts 48b, 48c on the movable contact plate 46 overlap respectively with the fixed contacts 43d, 43b. However, none of the movable contacts of the movable contact plate 47 overlap with the fixed contacts. Therefore, only the fixed contacts 43d and 43b are mutually connected, so that the electric power generated by the generator 2 driven by the recoil starter 14 can be supplied only to the engine drive system loads.

As shown in FIG. 14, in the ignition-OFF (OFF) position, all the fixed contacts (the first power source contacts, the ignition contacts, the second power source contact, and the DC contact) are mutually disconnected. In addition, in the ignition-ON (ON) position, all the fixed contacts (the first power source contacts, the ignition contacts, the second power source contact, and the DC contact) are mutually connected. Further, in the recoil start (RE) position, only the first power source contacts and the ignition contacts are mutually connected.

Incidentally, while an example in which a relay is used as switching means for connection or disconnection between the generator 2 and the battery 3 has been shown in the above embodiments, the present invention is not limited to this configuration, and other switches than the relay may be used to realize the desired configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric power supply system for a vehicle, comprising:
   a generator driven by an engine to generate electric power;
   a battery charged by the electric power generated by said generator;
   a control unit for controlling said engine by electric power supplied from said battery; and
   a relay disposed between said battery and said generator and operative to make disconnection or connection between said generator and said battery according to an instruction from said control unit, thereby inhibiting charging or canceling the inhibition of charging,
   wherein said relay is included in a circuit that can be detachably attached to said control unit, and said control unit is configured so that a connection circuit for connection of a connection terminal to the circuit that includes the relay can be detachably attached in place of the circuit that includes the relay.

2. The electric power supply system for a vehicle a set forth in claim 1, wherein the circuit that includes the relay and said connection circuit are each configured as a sub harness that can be detachably attached to said control unit.

3. The electric power supply system for a vehicle as set forth in claim 1, wherein the relay includes two relays disposed in parallel to constitute a charging inhibition relay.

4. The electric power supply system for a vehicle as set forth in claim 2, wherein the relay includes two relays disposed in parallel to constitute a charging inhibition relay.

5. The electric power supply system for a vehicle as set forth in claim 1, wherein the circuit that includes the relay is connected to the control unit when the vehicle includes a recoil starter, and the connection circuit is connected to the control unit when the vehicle does not include a recoil starter.

6. The electric power supply system for a vehicle as set forth in claim 2, wherein the circuit that includes the relay is connected to the control unit when the vehicle includes a recoil starter, and the connection circuit is connected to the control unit when the vehicle does not include a recoil starter.

7. An electric power supply system for a vehicle, comprising:
   a generator driven by an engine to generate electric power;
   a battery charged by the electric power generated by said generator;
   a charging circuit for charging said battery with the electric power generated by said generator;
   a drive electric power supply circuit for supplying an engine drive system load with the electric power generated by said generator; and
   a switch having a recoil start position as a changeover position,
   wherein said switch includes a contact configuration to disconnect said charging circuit and connect said drive electric power supply circuit when said switch is changed over to said recoil start position,
   wherein the switch includes a switch case having fixed contacts and a movable insulating block therein, the fixed contacts being disposed on a fixed insulating block, and
   wherein the fixed contacts include a DC contact, a pair of first power source contacts, a pair of second power source contacts, and a pair of ignition contacts.

8. The electric power supply system for a vehicle as set forth in claim 7 wherein the DC contact is connected to a lamp/display system load, the pair of first power source contacts are connected to an output side of a regulator, the pair of second power source contacts are connected to the battery, and the pair of ignition contacts are connected to the engine drive system.

9. An electric power supply system for a vehicle, comprising:
   a control unit for controlling an engine of the vehicle by electric power supplied from a battery of the vehicle; and
   a relay disposable between the battery and the generator and operative to make disconnection or connection between the generator and the battery according to an instruction from said control unit, thereby inhibiting charging or canceling the inhibition of charging,
   wherein said relay is included in a circuit that can be detachably attached to said control unit, and said control unit is configured so that a connection circuit for connection of a connection terminal to the circuit that includes the relay can be detachably attached in place of the circuit that includes the relay.

10. The electric power supply system for a vehicle as set forth in claim 9, wherein the circuit that includes the relay and said connection circuit are each configured as a sub harness that can be detachably attached to said control unit.

11. The electric power supply system for a vehicle as set forth in claim 9, wherein the relay includes two relays disposed in parallel to constitute a charging inhibition relay.

12. The electric power supply system for a vehicle as set forth in claim 10, wherein the relay includes two relays disposed in parallel to constitute a charging inhibition relay.

13. The electric power supply system for a vehicle as set forth in claim 9, wherein the circuit that includes the relay is connected to the control unit when the vehicle includes a recoil starter, and the connection circuit is connected to the control unit when the vehicle does not include a recoil starter.

14. The electric power supply system for a vehicle as set forth in claim 10, wherein the circuit that includes the relay is connected to the control unit when the vehicle includes a recoil starter, and the connection circuit is connected to the control unit when the vehicle does not include a recoil starter.

* * * * *